C. R. BIRDSEY.
PROCESS AND METHOD OF MOLDING GYPSUM BLOCKS.
APPLICATION FILED DEC. 15, 1919.
1,372,861.  Patented Mar. 29, 1921.
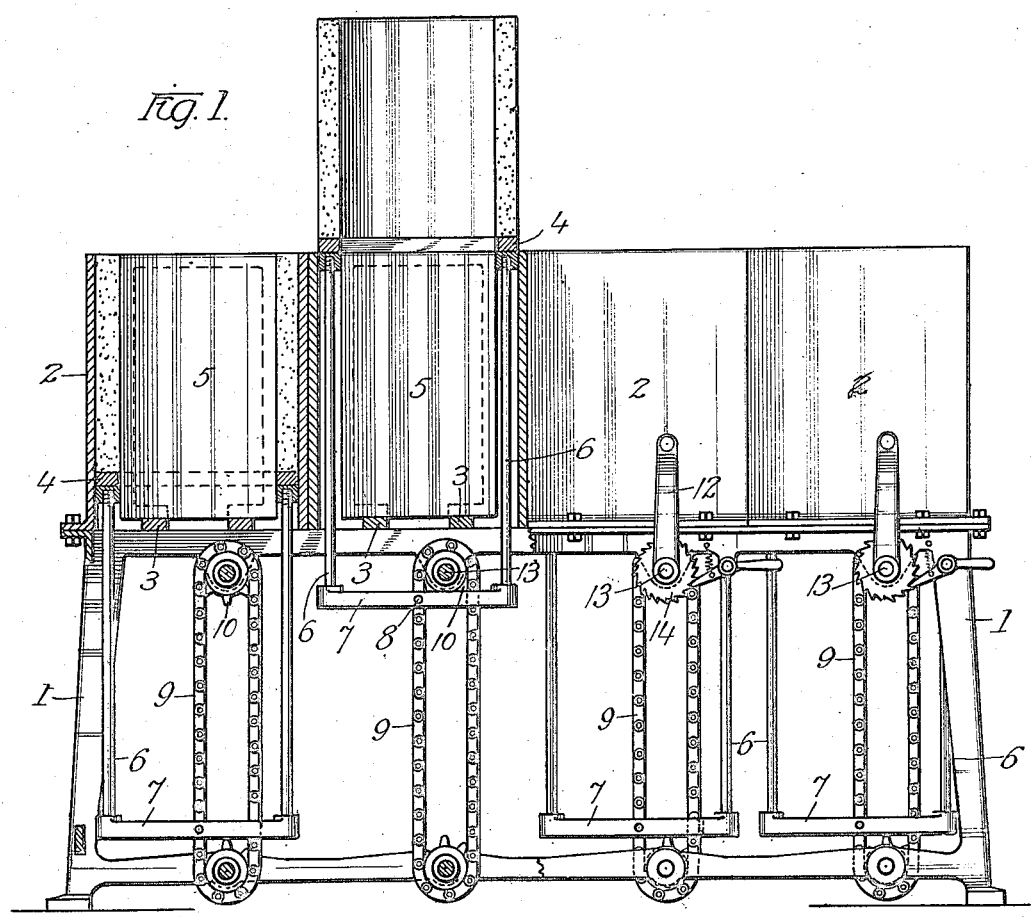
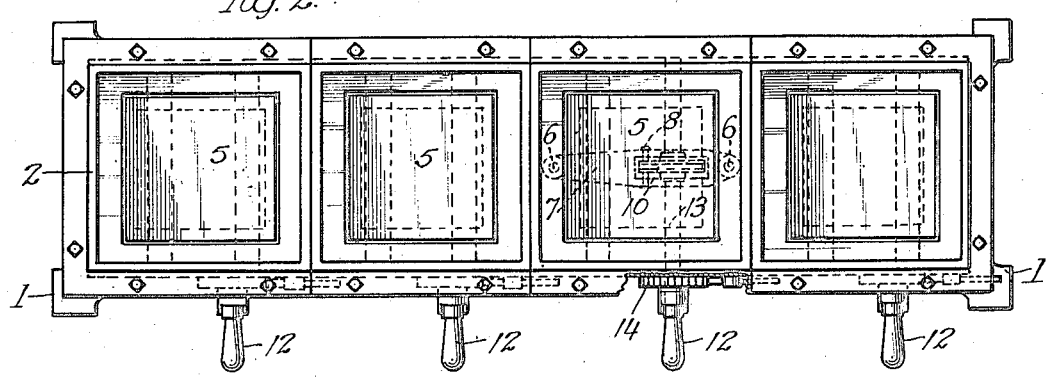
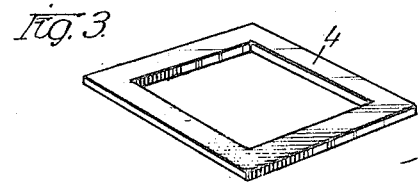
Inventor
Charles R. Birdsey

UNITED STATES PATENT OFFICE.

CHARLES R. BIRDSEY, OF CHICAGO, ILLINOIS, ASSIGNOR TO AVERY GYPSUM COMPANY, OF CHICAGO, ILLINOIS, A CORPORATION OF NEW JERSEY.

PROCESS AND METHOD OF MOLDING GYPSUM BLOCKS.

1,372,861.     Specification of Letters Patent.     Patented Mar. 29, 1921.

Application filed December 15, 1919. Serial No. 344,840.

*To all whom it may concern:*

Be it known that I, CHARLES R. BIRDSEY, a citizen of the United States, residing at Chicago, in the county of Cook and State of Illinois, have invented certain new and useful Improvements in the Processes and Methods of Molding Gypsum Blocks, of which the following is a description.

My invention belongs to the general art of producing blocks of various forms and shapes from calcined gypsum for various purposes, such for illustration, as in building operations, and generally in the mechanic arts wherever such material is adapted for use.

It has for its object the molding of such blocks in a more economical and convenient manner, resulting in a more satisfactory product than is possible under the usual methods heretofore employed.

To this end my invention consists in the novel process and method, herein set forth and described, and more particularly pointed out in the claim.

In the drawings presented herewith for the purpose of illustrating my process,

Figure 1 is a side elevation of a simple form of machine adapted for use in carrying my process into effect, parts being broken away and sectioned to more clearly point out and illustrate the operation of the same.

Fig. 2 is a plan view of said machine, and

Fig. 3 is a perspective view of the supporting board for the gypsum block, provided with an open center to inclose a core where such is used.

Heretofore gypsum blocks have commonly been produced by mixing a suitable quantity of the calcined gypsum with water and stucco, or other desired material, producing a semi-fluid mass adapted to pour. This mass is then poured into a form, provided with collapsible sides and allowed to set. After the setting of the gypsum has been completed usually to the point where the material becomes hard and brittle, the sides of the mold are removed, and if one or more cores have been used, these are withdrawn and the block then removed from the mold. The gypsum material is adhesive or sticky in its nature, and has a tendency to adhere to the sides of the mold, as well as to the cores. It also expands as it sets. This increases the difficulty in freeing it from the mold and core.

I have discovered that there is a certain critical stage in the setting action of this semi-fluid mass of gypsum, where the material is not brittle or hard, but is of a jelly-like consistency sufficient, however, to cause it to retain its form or shape provided it is removed from the mold with care. As stated above, the mass is adhesive and sticky and possesses but slight structural consistency.

I have discovered that at this critical point in the consistency of the block, it may be expelled from a stripping or displacement type of mold, without distorting the form, or changing the shape of the original mass as it is partially set in the mold, producing at the same time a smoothing or troweling effect as the block is moved against the smooth face of the walls of the mold or core during the expelling operation.

Describing my process further by means of the simple form of machine shown in the drawings, 1 is a suitable frame supporting in a preferably elevated position a plurality of molds 2. 3 indicates the bottom supports of the molds. 4 is a follower arranged to normally rest in proximity to the bottom 3, and provided with means whereby the follower may be elevated, as shown in Fig. 1. 5 is a suitable core, (a single core as illustrated) centrally positioned within the mold and supported upon and preferably secured to the base supports 3. The follower 4, when one or more cores are used, is provided with an open space adapted to loosely embrace the core or cores so as to permit a longitudinal movement in relation thereto as the follower 4 with the gypsum block resting thereon is elevated. Any preferred means may be employed for securing this operation. The simple form shown in the drawings being illustrative merely as herein shown. Bars 6—6, or their equivalent, for the purpose, extend to and at their upper end are connected to and control the movement of the follower 4. A cross piece 7 is shown connecting the lower ends of the rods 6, said cross piece being secured as at 8 to a sprocket chain 9, mounted upon sprocket wheels 10 and 11. A crank 12 mounted upon the shaft 13 which carries the upper sprocket wheel 10 is provided with a ratchet wheel 14, provided with a pawl 15. By operating the handle the sprocket 9 will be driven, and the cross piece 7, with its connected parts including the follower 4, may be raised and lowered as desired. Equivalent means for the same purpose may be provided.

The semi-fluid mass of gypsum, water and such other material as is desired, is poured into the space between the core or cores and the walls of the mold, suitable reinforcing material being positioned therein, when desired. The follower 4 is then in its lowered position, as shown in the left end mold of Fig. 1. After waiting a suitable period for the mass to assume the jelly-like consistency referred to, the follower 4 is elevated and the block slips longitudinally of the core and the walls 2 of the form, being sustained in the elevated position shown in the second mold from the left from Fig. 1. In thus moving the block longitudinally of the parts 5 and 2, there is secured the smoothing or troweling effect referred to. After allowing the block to remain in such position a sufficient length of time to permit its further setting and handling, it may then be removed and the operation repeated, the curing of the gypsum block continuing until it is perfected.

In practice I prefer to use a plurality of molds placed sufficiently close to one another, and preferably connected as a complete machine, so that the operation of the various molds may be in sequence, one after the other, the time employed being substantially sufficient, that after reaching the last mold, the first mold will be ready for elevation as described, and after successively elevating the blocks, as stated, and reaching the last mold, the first one will be ready for removal, thus expediting the operating, and economizing the manufacture.

The set of a mixture of gypsum and water, as stated above, can be regulated to occur at any desired length of time, within certain limits. For illustration, if the normal time of set of the particular calcined gypsum is twenty minutes, this can be hastened by the addition of an accelerator, well known in the art, and commonly employed in the manufacture of gypsum blocks. This can be employed to an extent that will bring the setting time down to an extreme of approximately three minutes, if desired. The setting time also can be lengthened, or increased, by the addition of material, usually termed in the art, a retarder, also in common use. Thus the regulation of time may be controlled as desired.

I have discovered that the critical point, in relation to my process,—that when the gypsum has reached the jelly-like consistency referred to, whereby it may be moved in relation to the mold,—may be readily determined by those skilled in the art, and that it continues for a period of substantially twenty per cent. of the total setting time, beginning at about forty per cent. of the total setting time of the mass, and ending at about sixty per cent. of the time between the pouring and the final setting. That is to say, I have discovered that at a point between the forty per cent. and the sixty per cent. period from the initial pouring to the setting point, readily determined by those skilled in the art, the mass is in proper condition and consistency to be ejected from the mold, as above set forth, to secure the particular results of my discovery. The process can only be carried into effect at a critical period roughly set forth above. Before the mass reaches that point it lacks sufficient consistency to hold its form and will partially flow. After it reaches that point it will stick or adhere to the mold and cannot be moved therein. This difficulty is increased by the expanding of the block in the mold.

It is obvious that hydraulic or other suitable power may be employed for the purpose of operating the mold, as described, or other preferred means employed for securing the operation described, the object being simply to reliably retain the mass in the proper form until it has reached the point described, when it may be then removed from the mold substantially as described, and after allowing a certain period for further setting, may then be entirely removed.

It is obvious the reverse operation, moving the core and mold relatively to the block, accomplishes the same result and the particular method employed, is optional. It is also obvious that one core or a plurality of cores, of preferred size and form may be used.

Having thus described my invention, I do not wish to be understood as limiting myself other than as is set forth in the claim attached hereto.

What I claim as new and desire to secure by Letters Patent is:

The process of manufacturing gypsum blocks consisting in mixing the gypsum and coöperating material for the blocks with water, to secure a pouring fluidity, then pouring the same into a mold and allowing the material to set until it has acquired a jelly-like consistency sufficient to cause it to retain its form when removing it from the mold, then forcing the block from the mold by a relative sliding movement between the mold and block, and allowing the block to further set, substantially as described.

In testimony whereof, I have hereunto signed my name in the presence of two subscribing witnesses.

CHARLES R. BIRDSEY.

Witnesses:
  JOHN W. HILL,
  BERTHA HARTMANN.